US010994655B2

(12) United States Patent
Tatara

(10) Patent No.: US 10,994,655 B2
(45) Date of Patent: May 4, 2021

(54) ELECTRONIC CONTROL UNIT AND IN-VEHICLE VIDEO SYSTEM

(71) Applicant: KOITO MANUFACTURING CO., LTD., Tokyo (JP)

(72) Inventor: Naoki Tatara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 575 days.

(21) Appl. No.: 14/837,537

(22) Filed: Aug. 27, 2015

(65) Prior Publication Data
US 2016/0059781 A1 Mar. 3, 2016

(30) Foreign Application Priority Data

Aug. 27, 2014 (JP) .............................. JP2014-172896

(51) Int. Cl.
*B60R 1/00* (2006.01)
*H04N 7/18* (2006.01)

(52) U.S. Cl.
CPC ............... *B60R 1/00* (2013.01); *H04N 7/181* (2013.01); *B60R 2300/105* (2013.01); *B60R 2300/303* (2013.01); *B60R 2300/802* (2013.01)

(58) Field of Classification Search
CPC ............... B60R 1/00; B60R 2300/105; B60R 2300/303; B60R 2300/802; H04N 7/181
(Continued)

(56) References Cited

U.S. PATENT DOCUMENTS

2003/0122930 A1* 7/2003 Schofield .................. B60R 1/00
348/148
2003/0202096 A1* 10/2003 Kim .......................... B60R 1/00
348/148
(Continued)

FOREIGN PATENT DOCUMENTS

JP     H07-223487 A     8/1995
JP     H9-323590 A      12/1997
(Continued)

OTHER PUBLICATIONS

Wikipedia contributors. "Data compression ratio." Wikipedia, The Free Encyclopedia, May 17, 2020, 01:14 UTC, <https://en.wikipedia.org/wiki/Data_compression_ratio> [accessed Aug. 29, 2020]. (Year: 2020).*

(Continued)

*Primary Examiner* — Jeffery A Williams
*Assistant Examiner* — Kristin Dobbs
(74) *Attorney, Agent, or Firm* — Osha Bergman Watanabe & Burton LLP

(57) ABSTRACT

An in-vehicle video system includes cameras that capture rear and side areas of a vehicle body, monitors that display video images captured by the cameras on screens thereof, and an ECU that shapes the video images that are displayed on the monitors. The cameras are accommodated in housings that are provided on left and right sides of a vehicle body, and side turn signal lamps are provided individually on external surfaces of the housings. The ECU controls a video image processing circuit so that the video images of the rear and side areas of the vehicle body are displayed on two portions of the screen of the monitor at different compression ratios and that the compression ratios change according to vehicle information.

2 Claims, 10 Drawing Sheets

(58) Field of Classification Search
USPC .......................................................... 348/148
See application file for complete search history.

(56) References Cited

U.S. PATENT DOCUMENTS

| | | |
|---|---|---|
| 2011/0193961 A1 | 8/2011 | Peterson |
| 2011/0267452 A1* | 11/2011 | Notsu ................ G06K 9/00798 |
| | | 348/116 |
| 2012/0169875 A1 | 7/2012 | Matsukawa et al. |

FOREIGN PATENT DOCUMENTS

| | | |
|---|---|---|
| JP | H10-257482 A | 9/1998 |
| JP | 2003-312359 A | 11/2003 |
| JP | 2007-288586 A | 11/2007 |
| JP | 2011-184030 A | 9/2011 |
| JP | 2012-140106 A | 7/2012 |
| JP | 2013-207746 A | 10/2013 |

OTHER PUBLICATIONS

Preliminary Search Report and Written Opinion issued in corresponding French Application No. 1557967, dated Jun. 15, 2016 (9 pages).
Notification of Reasons for Refusal issued in Japanese Application No. 2014-172896, dated Apr. 10, 2018 (9 pages).
Decision of Refusal issued in Japanese Application No. 2014-172896, dated Nov. 19, 2018 (8 pages).
Office Action issued in Japanese Application No. 2019-019472, dated Nov. 5, 2019 (9 pages).

* cited by examiner

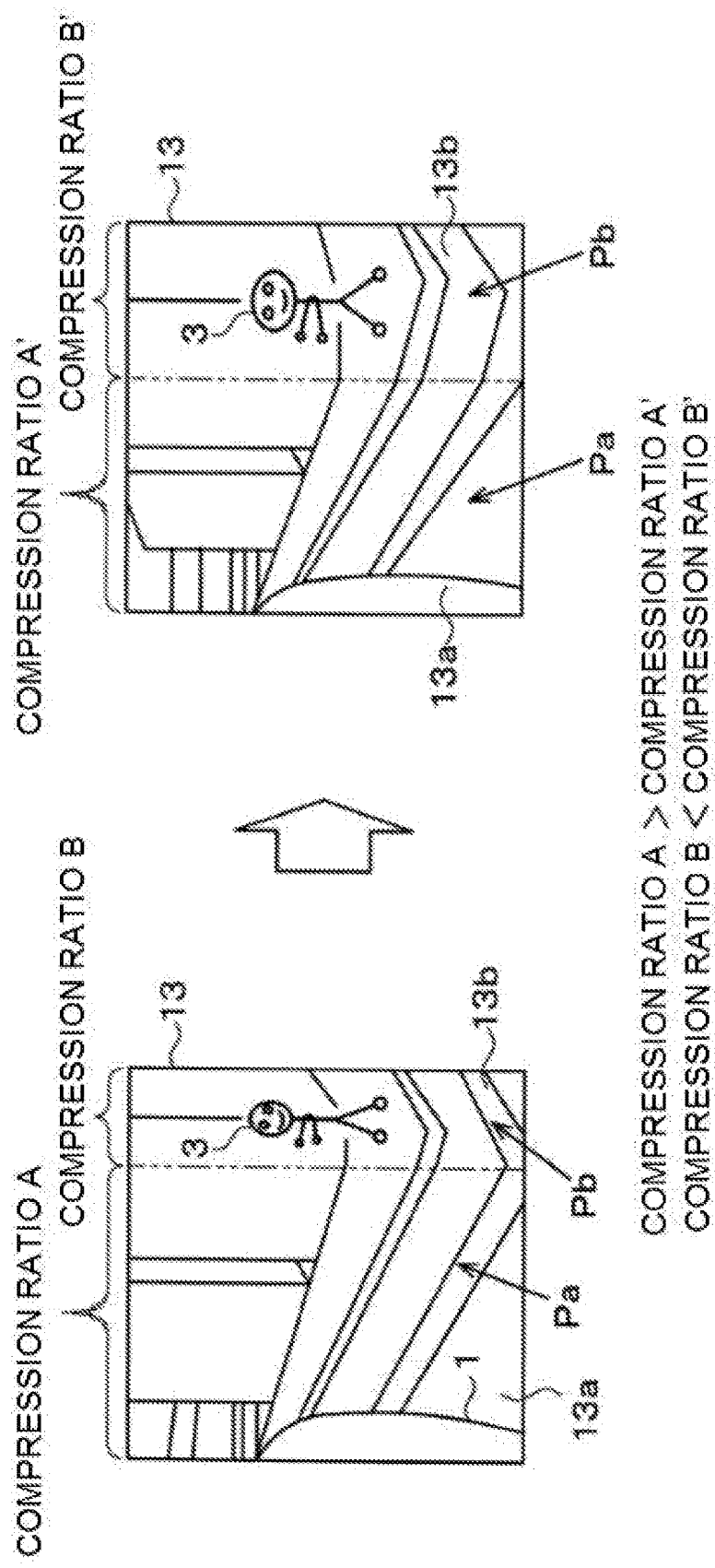

VIDEO IMAGE CAPTURED BY CAMERA (UNPROCESSED)

COMPRESSION RATIO C > COMPRESSION RATIO D

COMPRESSION RATIO C < COMPRESSION RATIO D

# ELECTRONIC CONTROL UNIT AND IN-VEHICLE VIDEO SYSTEM

CROSS-REFERENCE TO RELATED APPLICATION

The present application claims the benefit of priority of Japanese Patent Application No. 2014-172896, filed on Aug. 27, 2014, which is incorporated herein by reference.

TECHNICAL FIELD

The present invention relates to an electronic control unit for executing data processing to shape a video image of a peripheral area of a vehicle body that is captured by an onboard camera so as to display the shaped video image on an onboard monitor and an in-vehicle video system including the electronic control unit.

BACKGROUND ART

A technology has conventionally been known in which a camera and a monitor are used in place of a side rear-view mirror and a video image of a peripheral area of a vehicle body that is taken by the camera is displayed on the monitor disposed in a passenger compartment of a vehicle. For example, JP-A-2003-312359 describes a "vehicle rear view recognition system" in which cameras are set on both left and right sides of a front portion of a vehicle body and a monitor is disposed in front of a driver's seat. JP-A-7-223487 describes a "vehicle peripheral situation display system" in which a moving body in a peripheral area of a vehicle is detected and an area including the moving body is highlighted on a screen of a monitor.

SUMMARY OF THE INVENTION

Incidentally, since an angle of view of a camera changes according to the specification of a lens, in the case of a side rear-view mirror, an area that constitutes a blind spot can be displayed on a monitor by, for example, using a wide-angle lens. However, with the method of changing the angle of view by using a lens, a peripheral area of a vehicle body that is displayed on a monitor does not coincide with a peripheral area of the vehicle body that is seen on a side rear-view mirror, and therefore, there is a possibility that a dangerous situation is called for by an error made by the driver in grasping an actual distance to an object in the peripheral area displayed on the monitor. Additionally, although a method is also known in which a plurality of cameras are used to capture video images of different areas and the video image data are combined for display on a monitor, in the event that this method is used, there is caused a problem that cost and time are required to process the video image data.

Then, an object of the invention is to provide an electronic control unit that can shape a video image captured by a camera so that the video image can easily be visualized by using an inexpensive data processing technology and an in-vehicle video system that includes the electronic control unit.

For solving the problem, the present invention provides an electronic control unit (hereinafter, referred to as an ECU) that executes data processing to shape a video image of a peripheral area of a vehicle body that is captured by an onboard camera so as to display the shaped video image on an onboard monitor. This ECU includes a video image shaping means that displays the video image data received by the camera on at least two portions of a screen of the monitor at different compression ratios.

Here, displaying the video image data at the different compression ratios means that the video image of the peripheral area of the vehicle body is displayed relatively large on the first portion of the screen of the monitor while being displayed relatively small on the second portion of the screen of the monitor. This includes a case where the video image captured by the camera is displayed on the first portion without being processed and the video image on the second portion is displayed larger or smaller than the video image on the first portion.

Additionally, in the ECU of the invention, the video image shaping means includes a video image processing circuit that changes the compression ratios of the video images that are displayed on at least the two portions of the screen of the monitor according to vehicle information. The vehicle information includes, for example, whether the vehicle is traveling forwards or reversing, whether the vehicle is turning left or right, whether or not there is a following vehicle or a vehicle traveling side by side with the subject vehicle, vehicle body speed, road conditions, weather, the brightness of surrounding environment, and the like, and all these pieces of information are provided to the ECU from sensors that are provided at portions of the vehicle body.

In an embodiment of the invention, the video image processing circuit processes the video image data that is displayed on at least the two portions of the screen of the monitor so that the compression ratios differ in a horizontal direction. In another embodiment of the invention, the video image processing circuit processes the video image data that is displayed on the two portions of the screen of the monitor so that the compression ratios differ in a vertical direction. In addition, the video image data can be processed so that the compression ratios differ in the horizontal direction and the vertical direction.

An in-vehicle video system of the invention includes a camera that captures a video image of a peripheral area of a vehicle body, a monitor that displays thereon video image data captured by the camera, and an ECU that executes a data processing to shape a video image that is to be displayed on the monitor, wherein the ECU includes a video image processing circuit that changes compression ratios of a video image that is displayed on at least two portions of a screen of the monitor according to vehicle information.

Here, the camera is accommodated in a housing and is set at a necessary portion of the vehicle body. Preferably, the housing can commonly be used to accommodate the camera and an illumination lamp. As the illumination lamp, a headlamp, a side turn signal lamp, a clearance lamp and the like can be raised.

According to the ECU and the in-vehicle video system of the invention, since the video image data captured by the camera is processed at the different compression ratios to be displayed on at least the two portions of the screen of the monitor, it is advantageous that the video image of the peripheral area of the vehicle body can be shaped so that the video image can easily be visualized by an inexpensive data processing technique.

BRIEF DESCRIPTION OF DRAWINGS

FIG. 3B shows model diagrams showing video image processing executed by the ECU when the vehicle is turning left.

DETAILED DESCRIPTION

Figure 1:
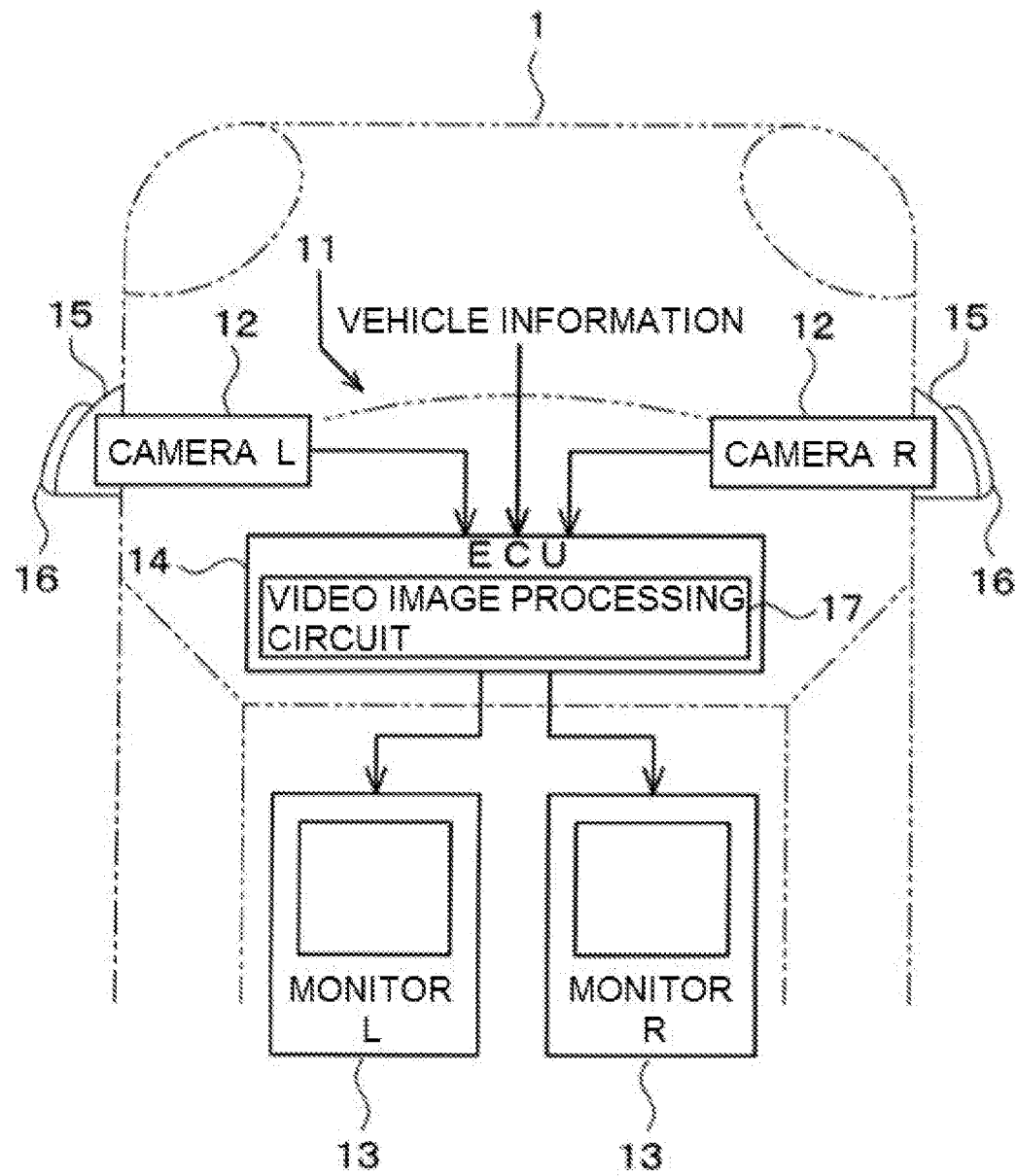
FIG. 1 is a block diagram of an in-vehicle video system showing an embodiment of the invention.

Hereinafter, an embodiment of the invention will be described based on the drawings. An in-vehicle video system 11 shown in FIG. 1 includes a pair of left and right cameras 12 for capturing images of rear and side areas of a vehicle body 1, a pair of left and right monitors 13 for displaying thereon video images captured by the cameras 12, and an ECU 14 for executing data processing to shape the video images for display on the monitors 13.

The cameras 12 are accommodated in interiors of housings 15 so as to be oriented to the rear of the vehicle body 1. The housings 15 are used as camera housings or lamp housings and are mounted, for example, on both left and right sides of a front portion of the vehicle body 1. A side turn signal lamp 16, which is an illumination lamp, is provided on an external surface of each housing 15. The monitors 13 are disposed in front of or near a driver's seat.

The ECU 14 is separated from the cameras 12 and the monitors 13 and is set at a suitable place on the vehicle body 1. The ECU 14 includes a video image processing circuit 17 for processing video image data captured by the cameras 12. The video image processing circuit 17 functions as a video image shaping means of the ECU 14. The video image processing circuit 17 is configured to cause video images of rear and side areas of the vehicle body 1 to be displayed on two portions of monitor screens at different compression ratios and to change the compression ratios according vehicle information.

Figure 2A:
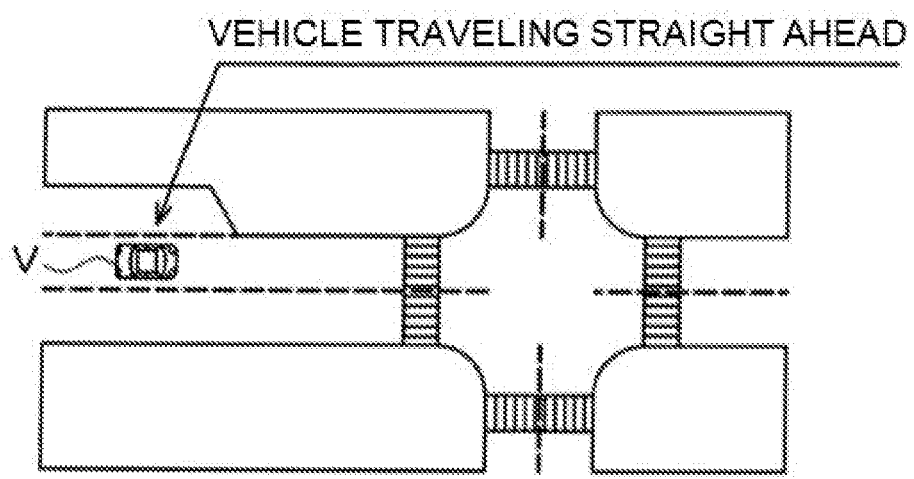
FIG. 2A shows a vehicle V that is traveling straight ahead at an intersection.
Figure 2B:
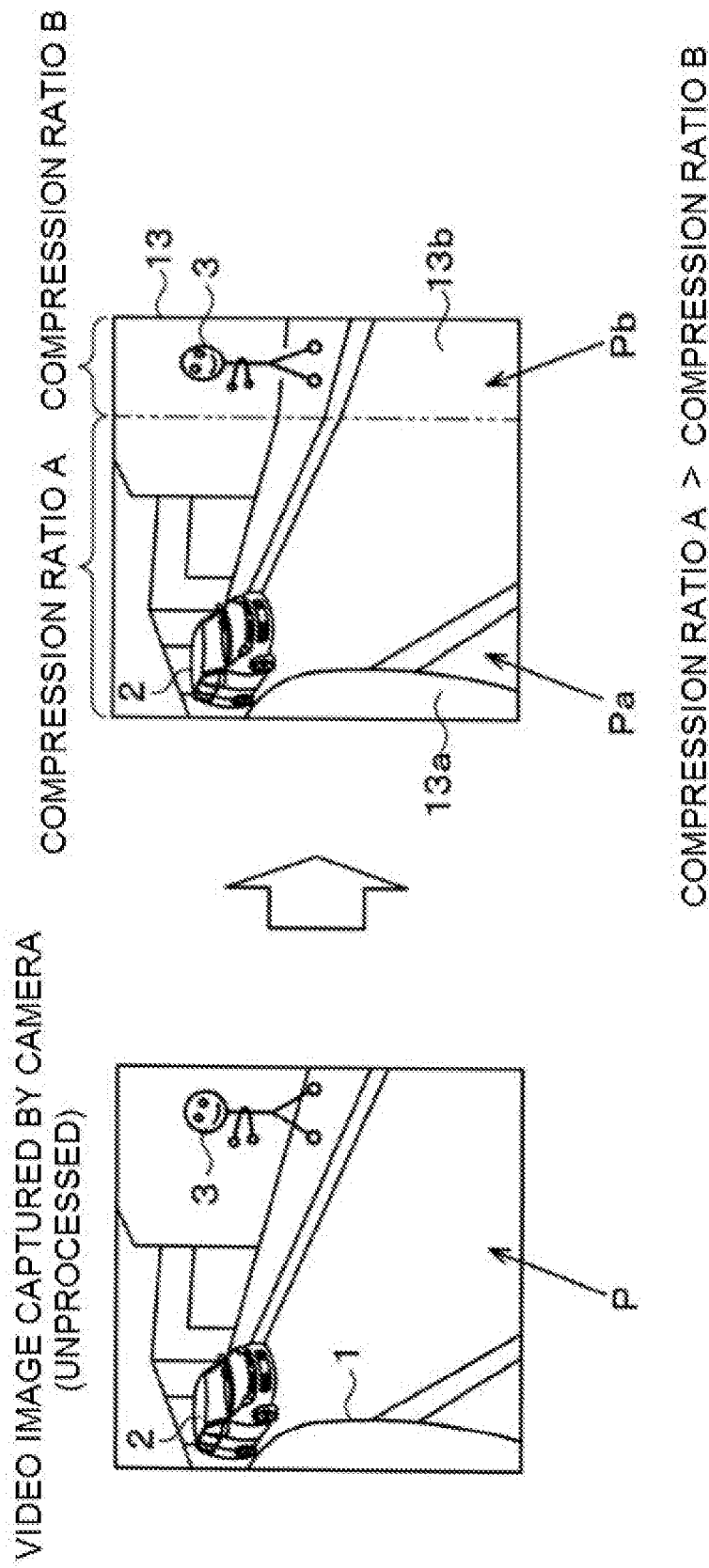
FIG. 2B shows video image processing when the vehicle V is traveling straight ahead at the intersection.

Next, video image processing by the ECU 14 will be described in detail by reference to FIGS. 2A to 5. FIG. 2A shows a vehicle V that is traveling straight ahead at an intersection. FIG. 2B shows video image processing when the vehicle V is traveling straight ahead at the intersection, in which a left figure of FIG. 2B shows an unprocessed video image that is captured by the left camera 12, and a right figure of FIG. 2B shows a processed video image that is displayed on the screen of the monitor 13. In FIG. 2B, reference numeral 1 denotes a vehicle body, reference numeral 2 denotes a following vehicle, and reference numeral 3 denotes a pedestrian.

The processed video image shown in the right figure of FIG. 2B is displayed on the screen of the monitor 13 while being divided into two in a horizontal direction. A video image Pa showing the rear of the vehicle body of the vehicle V is displayed on a left portion 13a of the monitor screen at a compression ratio A, and a video image Pb showing the side of the vehicle body is displayed on a right portion 13b at a compression ratio B. The compression ratio can be expressed in percentage based on the size of an unprocessed video image P shown in the left figure of FIG. 2B. In the illustrated example, the compression ratio A of the video image Pa is 100%, and the compression ratio B of the video image Pb is 80%. The compression ratios A, B denote horizontal compression ratios, and the video image is processed by the video image processing circuit 17 so that the compression ratio A is larger than the compression ration B or the compression ratio A> the compression ratio B. By adopting this configuration, the video image of the peripheral area of the vehicle body is displayed so that the external shape of the following vehicle 2 contained in the video image Pa on the left portion 13a is displayed relatively wider, while the external shape of the pedestrian 3 contained in the video image Pb on the right portion 13b is displayed relatively narrower.

Consequently, when the vehicle is traveling straight ahead, the video image of the rear of the subject vehicle that the driver tends to watch carefully, that is, the video image Pa that contains the following vehicle 2 rather than the pedestrian 3 can be displayed so as to easily be recognized by the driver. As the vehicle information when the vehicle is traveling straight ahead, a signal from a vehicle speed sensor, information from a car navigation system and the like can be used. In the illustrated example, although the video image Pa on the left portion 13a is shown in the same size as that of the unprocessed video image P (refer to the left figure of FIG. 2B), the video image Pa can be displayed larger at a compression ratio A that is equal to or greater than 100%, and accordingly, the video image Pb can be displayed smaller at a compression ratio B that is equal to or smaller than 80%.

Figure 3A:
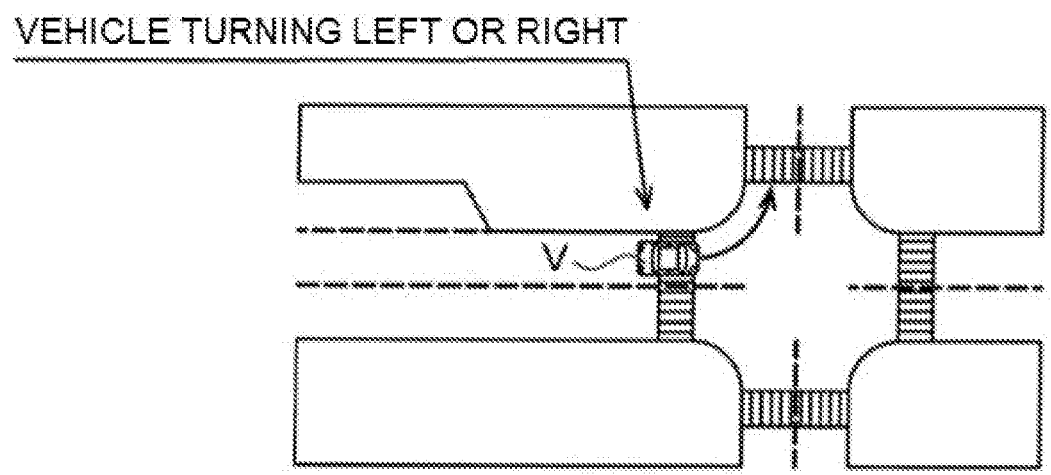
FIG. 3A shows the vehicle V that is about to turn left (or right).

A video image processing when the vehicle V is turning left (or right) at the intersection will be described in detail by reference to FIGS. 3A and 3B. FIG. 3A shows the vehicle V that is about to turn left. A left figure of FIG. 3B shows a video image that is displayed on the monitor 13 immediately before the vehicle V turns left. A right figure of FIG. 3B shows a video image captured when the vehicle V is turning left. In the video image captured to be displayed on the monitor 13 when the vehicle V is turning left (or right), the compression ratios of the video image that is displayed on two portions of the monitor screen are made to change as the vehicle V is moving.

Namely, on the screen of the monitor 13, a video image Pa on a left portion 13a is displayed at an compression ratio A immediately before the vehicle turns left, and the compression ratio changes to a compression ratio A' (for example, 80% of an unprocessed video image) that is smaller than the compression ratio A while the vehicle V is turning left (the compression ratio A> the compression ratio A'). On the other hand, a video image Pb on a right portion 13b is displayed at a compression ratio B immediately before the vehicle V turns left, and the compression ratio changes to a compression ratio B' (for example, 120% of the unprocessed image) that is larger than the compression ratio B while the vehicle V is turning left (the compression ratio B<the compression ratio B').

By adopting this configuration, the video image of the peripheral area of the vehicle body is displayed so as to be gradually reduced in size on the left portion 13a as the vehicle V is moving, while the video image is displayed so as to be gradually increased in size on the right portion 13b as the vehicle is moving. Consequently, when the vehicle is turning right or left, the video images of both the sides of the vehicle that the driver tends to watch carefully, that is, the video image Pb containing the pedestrian 3 who might be hit by the vehicle that is turning left can be displayed on the monitor 13 so as to be easily recognized by the driver. As the vehicle information when the vehicle V is turning left or right, a turn signal, information from the car navigation system, information on the line of sight of the driver, and the like can be used.

Figure 4A:
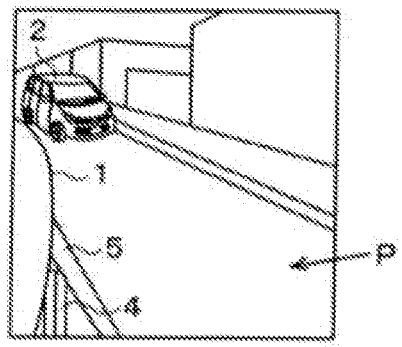
FIG. 4A shows an unprocessed video image captured by the camera while the vehicle is staying at a halt.
Figure 4B:
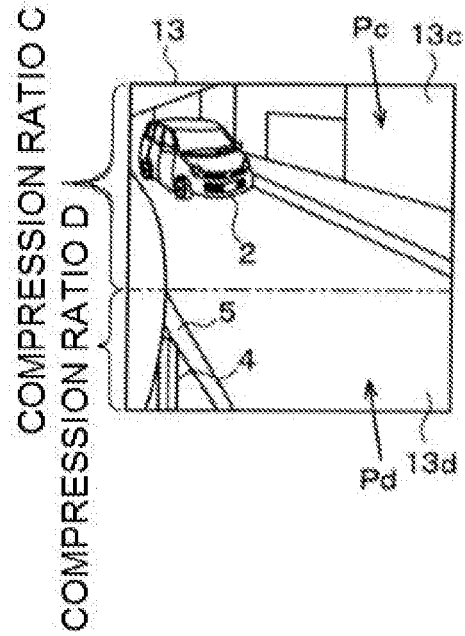
FIG. 4B shows a video image displayed on the monitor 13 while the vehicle is traveling straight ahead.
Figure 4C:
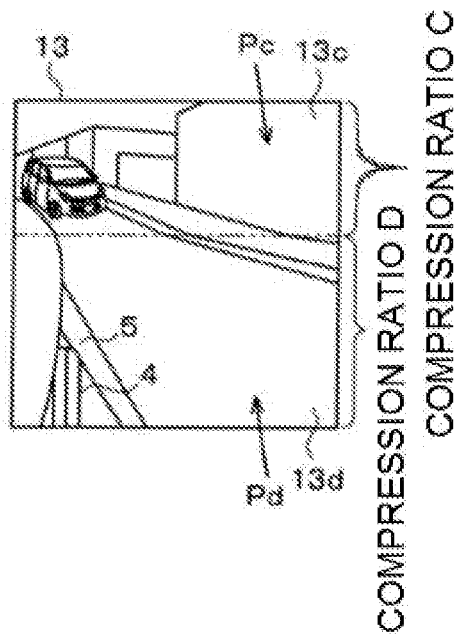
FIG. 4C shows a video image when the vehicle is reversing.

A video image processing executed by the ECU when the vehicle travels straight ahead or reverses will be described in detail by reference to model diagrams of FIGS. 4A to 4C. FIG. 4A shows an unprocessed video image captured by the camera 12 while the vehicle is staying at a halt. FIG. 4B shows a video image displayed on the monitor 13 while the vehicle is traveling straight ahead. FIG. 4C shows a video image when the vehicle is reversing. In the FIGS. 4A to 4C, reference numeral 2 denotes a following vehicle, reference numeral 4 denotes a rear wheel of the subject vehicle, and reference numeral 5 denotes a white line on a road surface.

Here, the video image processing circuit 17 divides the screen of the monitor 13 into two in a vertical direction and processes the video image that is displayed on two upper and lower portions so that the video image is displayed at different compression ratios in the vertical direction. Namely, when the vehicle travels straight ahead, a video image Pc containing the following vehicle 2 is displayed on an upper portion 13c of the monitor screen at a compression ratio C, and a video image Pd from a road surface containing the rear wheel 4 and the white line 5 to a lower edge of a side window is displayed on a lower portion 13d at a compression ratio D.

For example, assuming that the size of the unprocessed video image P (refer to FIG. 4A) is 100%, the compression ratio C of the video image Pc is 120%, and the compression ratio D of the video image Pb is 80%. The compression ratios C, D both denote vertical compression ratios. When the vehicle travels straight ahead, the video image data is processed so that the compression ratio C is larger than the compression ratio D or the compression ratio C> the compression ratio D, and the video image Pc on the upper portion 13c is displayed relatively large. When the vehicle reverses, the video image data is processed so that the compression ratio C is smaller than the compression ratio D or the compression ratio D< the compression ratio C, and the video image Pd on the lower portion 13d is displayed relatively large. Consequently, the video image immediately behind the subject vehicle that the driver wants to watch carefully when the vehicle is reversed, that is, the video image of the road surface including the rear wheel 4 and the white line 5 can be displayed on the monitor 13 so that the video image can easily be recognized by the driver.

Figure 5:
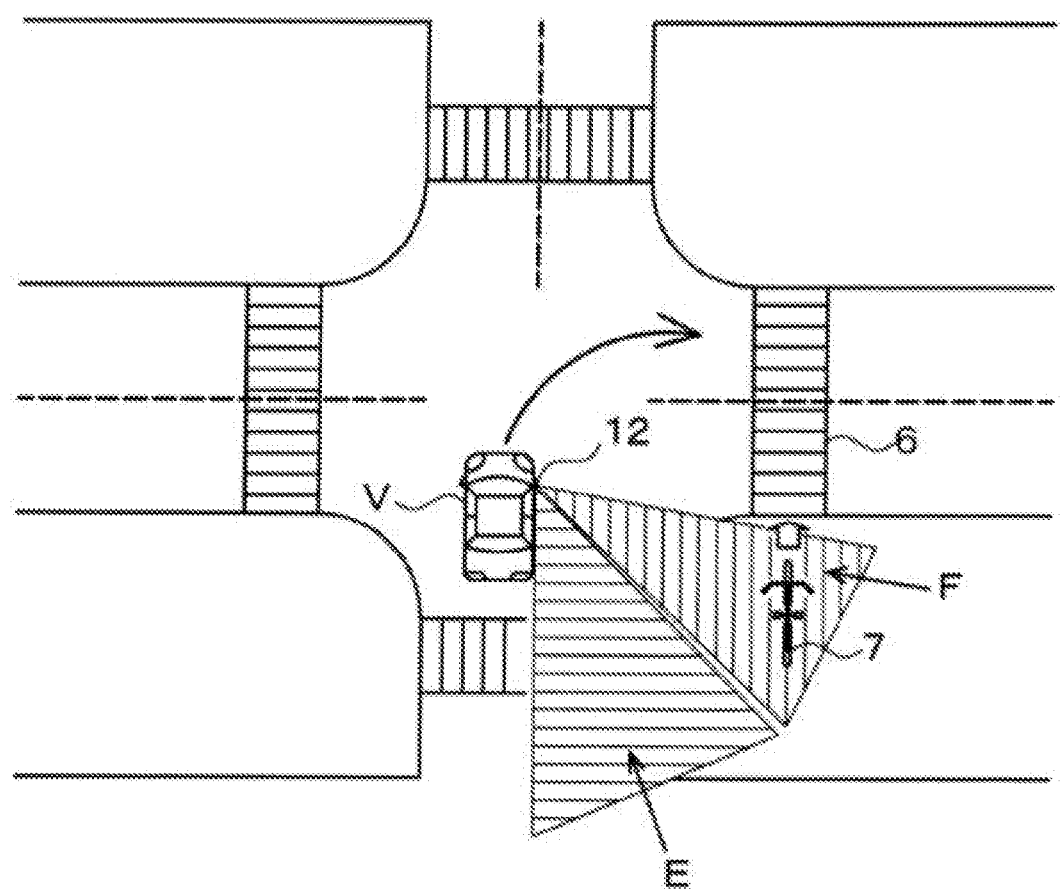
FIG. 5 is a model diagram showing video image processing executed by the ECU when the vehicle is turning right at an intersection.

FIG. 5 shows video image processing when the vehicle V turns right at the inter section. In the diagram, reference numeral 6 denotes a pedestrian crossing, and reference numeral 7 denotes a bicycle. Here, the cameras 12 are used wide-range sensors, and a video image captured by each camera 12 is divided into two in a horizontal plane, a display area E at the rear of the vehicle body and a communication area F on a side of the vehicle body are recorded separately in a memory (whose illustration is omitted).

Then, a video image contained in both the areas E, F is used for a drive recorder or a communication with an inter-vehicle communication system, and only a video image that is contained in the display area E is displayed on the monitor screen using the same method as that used when the vehicle turns left (refer to FIGS. 3A and 3B). Consequently, it is possible to store video images of a pedestrian and the bicycle 7 near the pedestrian crossing 6 that fall in a blind spot particularly when the vehicle turns right as a driving history.

The invention is not limited to the embodiment that has been described heretofore, and hence, as will be illustrated below, the invention can also be carried out by altering the configurations of the constituent portions as required without departing from the spirit and scope of the invention.

Figure 6:
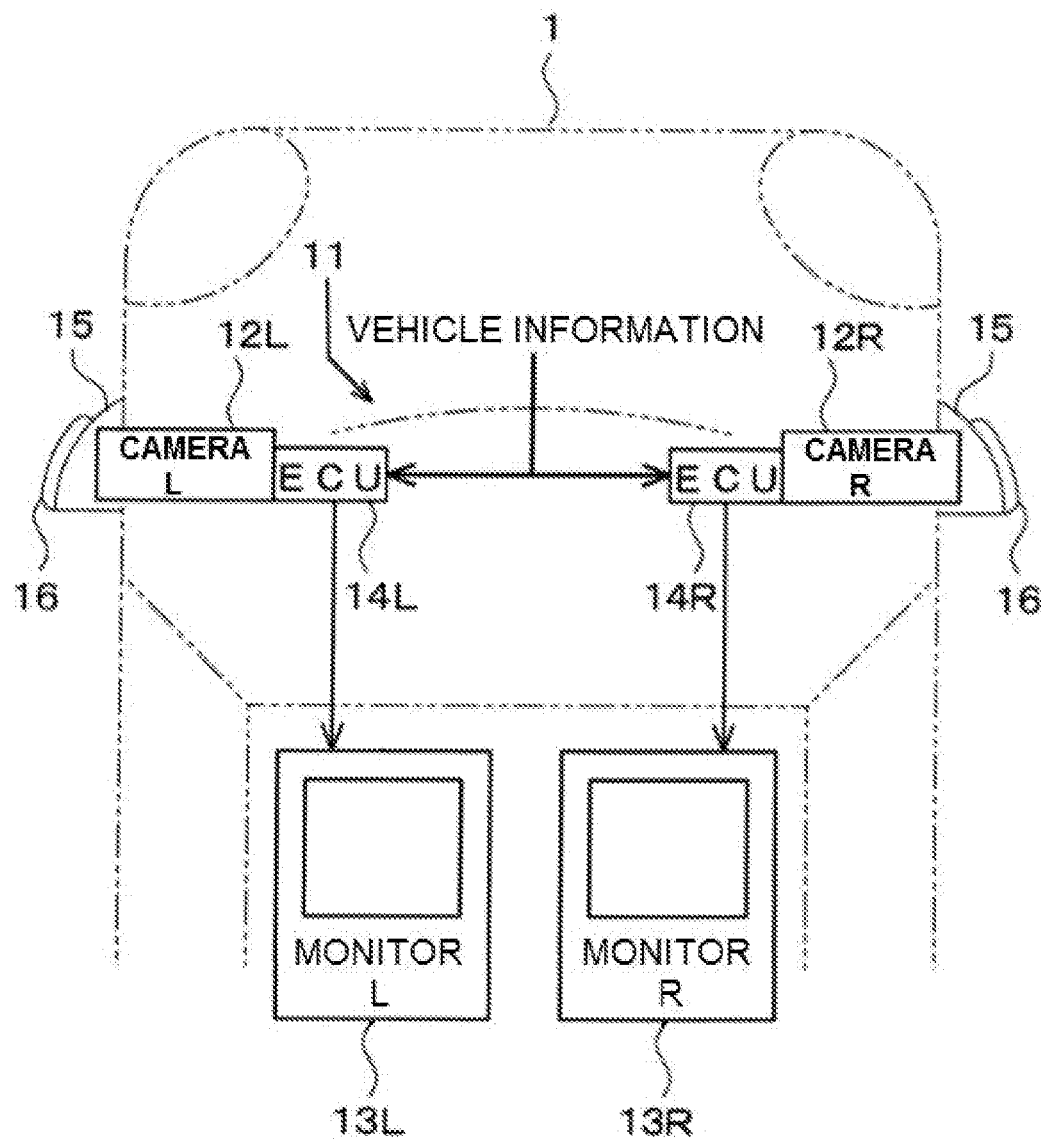
FIG. 6 is a block diagram showing a video system in which ECUs are added to corresponding cameras.

(A) As shown in FIG. 6, ECUs 14L, 14R are provided separately on left and right cameras 12L, 12R. A video image captured by the left camera 12L is shaped at the left ECU 14L to be displayed on a left monitor 13L, while a video image captured by the right camera 12R is shaped at the right ECU 14R to be displayed on a right monitor 13R.

Figure 7:
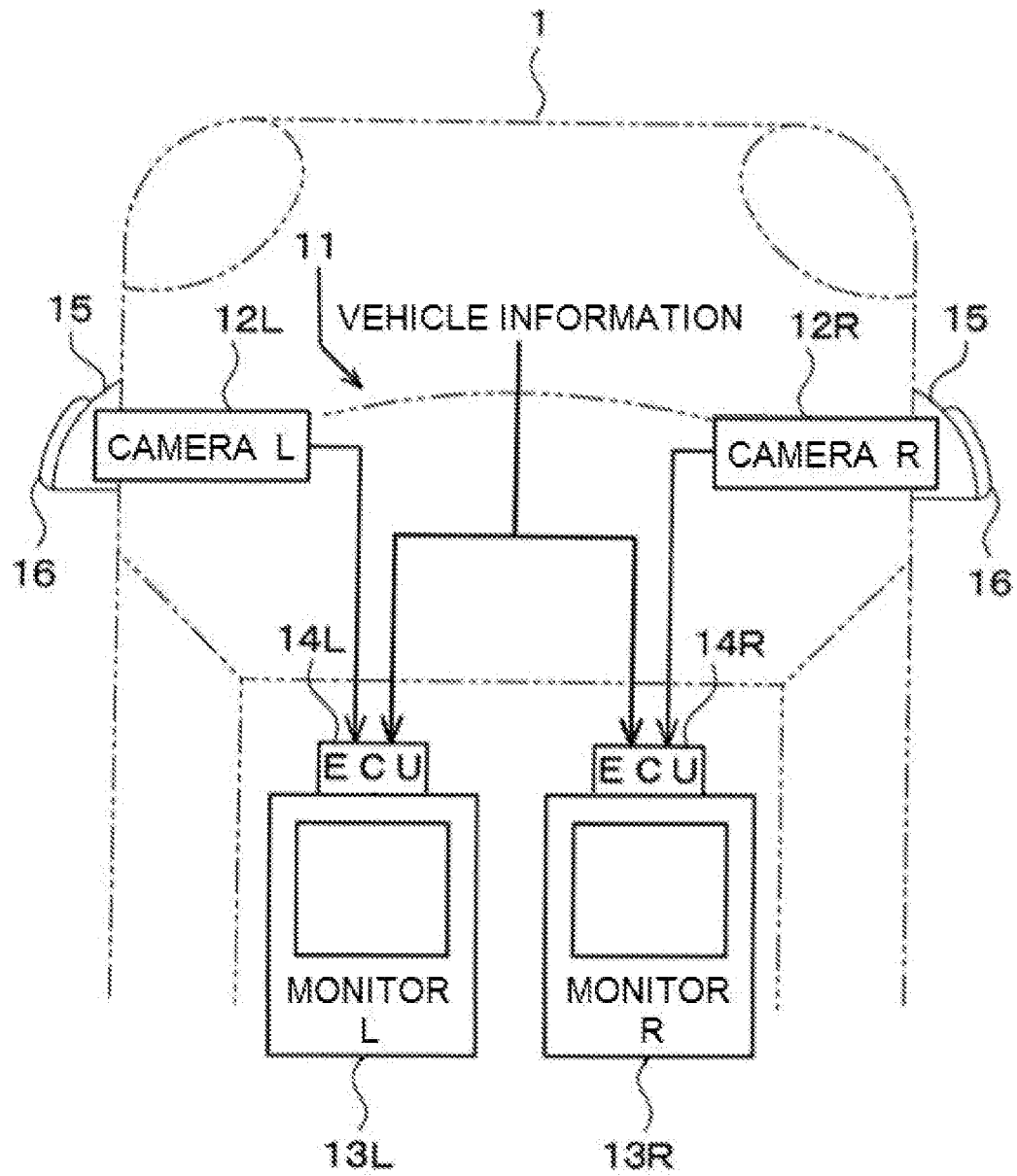
FIG. 7 is a block diagram showing a video system in which ECUs are added to corresponding monitors.

(B) As shown in FIG. 7, ECUs 14L, 14R are provided separately on left and right monitors 13L, 13R. A video image captured by a left camera 12L is shaped at the left ECU 14L to be displayed on the left monitor 13L, while a video image captured by a right camera 12R is shaped at the right ECU 14R to be displayed on the right monitor 13R.

(C) A camera on a preceding vehicle is used for an optical communication with a following vehicle. For example, a headlamp of a bicycle or a motorbike that is running to the rear of the preceding vehicle is turned on and off for a short period of time, so that an optical signal that signals the presence of the subject vehicle is transmitted to the preceding vehicle. The preceding vehicle receives the optical signal from the bicycle or the motor bike by the camera thereof, whereby the rider recognizes the presence of the following vehicle. When the preceding vehicle receives an optical signal from the following vehicle when the preceding vehicle is about to turn right or left or to depart from the current lane to an adjacent lane, a voice or visual warning is given to the driver of the preceding vehicle.

The invention claimed is:
1. An in-vehicle video system, comprising:
a camera configured to capture a video image of a peripheral area of a vehicle body together with the vehicle body;
a monitor configured to display the video image captured by the camera; and
an electronic controller configured to execute data processing to shape the video image displayed on the monitor, wherein
the camera is accommodated in a housing of an illumination lamp,
the electronic controller includes a video image processing circuit configured to change compression ratios of video images displayed on at least two portions of a screen of the monitor,
the compression ratio is a ratio of a size of a video image before shaped to a size of the video image after shaped,
the video images include a first video image portion obtained by capturing a video image of a part of the vehicle body and a rear of the vehicle body, and a second video image portion obtained by capturing a video image of a side of the vehicle body,
in a case where the vehicle body travels straight through an intersection, the video image processing circuit is configured to set a compression ratio of the first video image portion to a value greater than a compression ratio of the second video image portion, and
in a case where the vehicle body turns right or left at the intersection, the video image processing circuit is configured to increase the compression ratio of the second video image portion at a beginning of turning right or left and during the turning right or left.

2. The in-vehicle video system according to claim 1, wherein the illumination lamp includes a pair of side turn signal lamps on right and left side surfaces of the vehicle body, the illumination lamp is provided such that the camera is directed to the rear of the vehicle body, and the camera is configured to capture the side of the vehicle body and the rear of the vehicle body.

* * * * *